(12) United States Patent
Tollenaere (10) Patent No.: US 11,498,813 B1
(45) Date of Patent: Nov. 15, 2022

(54) VERTICAL LIFT SYSTEM (71) Applicant: Donald John Tollenaere, West Union, SC (US)

(72) Inventor: Donald John Tollenaere, West Union, SC (US)

( * ) Notice: Subject to any disclaimer, the term of this patent is extended or adjusted under 35 U.S.C. 154(b) by 0 days.

(21) Appl. No.: 17/718,724

(22) Filed: Apr. 12, 2022

(51) Int. Cl.
*B66C 1/12* (2006.01)
*B66C 1/62* (2006.01)
*B65G 7/12* (2006.01)

(52) U.S. Cl.
CPC ............... *B66C 1/12* (2013.01); *B66C 1/62* (2013.01); *B65G 7/12* (2013.01)

(58) Field of Classification Search
CPC .. B66C 1/12; B66C 1/62; B66C 1/108; B66C 1/445; B66C 23/24; B66C 23/207; B65G 7/12
USPC ............................................... 294/119.2, 104
See application file for complete search history.

(56) References Cited

U.S. PATENT DOCUMENTS

| | | | | |
|---|---|---|---|---|
| 1,556,645 A * | 10/1925 | Stoney | ................... | B22D 29/02 164/261 |
| 1,970,617 A | 8/1934 | Morgan | | |
| 2,987,340 A * | 6/1961 | Mattera | ..................... | B66C 1/20 294/81.2 |
| 3,206,243 A | 9/1965 | Miles | | |
| 3,709,548 A * | 1/1973 | Hogshead | ............... | B66C 1/125 294/82.12 |
| 3,752,083 A * | 8/1973 | Bitterberg | ................. | B66C 1/12 105/157.1 |
| 4,114,765 A * | 9/1978 | Kojima | ..................... | B66C 1/12 294/81.4 |
| 4,397,493 A | 8/1983 | Khachaturian et al. | | |
| 4,538,849 A | 9/1985 | Khachaturian et al. | | |
| 4,736,976 A * | 4/1988 | Berzenye | .................. | B66C 1/14 294/82.13 |
| 5,037,151 A * | 8/1991 | Kameyama | ............... | B66C 1/12 294/81.61 |
| 5,603,544 A | 2/1997 | Bishop et al. | | |
| 5,863,085 A | 1/1999 | Khachaturian | | |
| 6,079,760 A | 6/2000 | Khachaturian | | |
| 7,159,912 B2 * | 1/2007 | Gerhausser | ............... | B66C 1/12 294/81.2 |
| 7,967,352 B2 | 6/2011 | Di Martino | | |

(Continued)

OTHER PUBLICATIONS

Wire Rope Exchange; Versabar offers newly patented Versa-Adjust spreader bar; Internet Website: http://wireropeexchange.com/news/view/6992/versabar-offers-newly-patented-versa-adjust-spreader-bar; posted on Aug. 23, 2016; 3 pages.

*Primary Examiner* — Paul T Chin
(74) *Attorney, Agent, or Firm* — Dority & Manning, P.A.

(57) ABSTRACT

A vertical lift system includes a cable with a pair of mounting loops positioned at opposite end portions of the cable, a lift bar, and a pair of cable blocks mounted to the lift bar at opposite end portions of the lift bar. The cable is mountable to the lift bar at the pair of cable blocks. A lift block is mounted to the lift bar between the pair of cable blocks. A spreader bar is mountable to the cable. The spreader bar includes an elongated shaft and a pair of cable couplings mounted to elongated shaft at opposite end positions of the elongated shaft. The cable is extendable through the pair of cable blocks on the lift bar and the pair of cable couplings of the spreader bar such that spreader bar is positioned between the lift block and the pair of mounting loops of the cable.

20 Claims, 6 Drawing Sheets

(56) References Cited

U.S. PATENT DOCUMENTS

| | | | |
|---|---|---|---|
| 9,132,993 B1 | 9/2015 | DiMartino et al. | |
| 10,059,570 B1 * | 8/2018 | Tollenaere | B66C 1/12 |
| 11,155,445 B2 * | 10/2021 | Jensen | B66C 1/108 |

* cited by examiner

VERTICAL LIFT SYSTEM

FIELD OF THE INVENTION

The present subject matter relates generally to systems for vertical lifting, such as during aircraft recovery operations.

BACKGROUND OF THE INVENTION

Helicopters are frequently used to lift and transport loads. To transport certain loads, a long line connects the load to the helicopter. Such long lines may be used to carry are variety of loads, including trees, HVAC units, signs, etc. A long line generally includes a single cable, and lifting certain loads via a single cable can be difficult. For instance, aircraft recovery is a difficult lifting operation because attaching the long line to the downed aircraft is challenging.

Accordingly, an improved vertical lift system would be useful. Moreover, a vertical lift system for assisting with long line aircraft recovery would be useful.

BRIEF DESCRIPTION OF THE INVENTION

The present subject matter provides a vertical lift system. The vertical lift system includes a cable, a lift bar, and a spreader bar. The lift bar may be attached to an end of a long line, e.g., that is connected to an airborne helicopter, at a lift block connected to the lift bar. Both ends of the cable may include a mounting loops that are mountable to a load to be lifted by the helicopter, such as a grounded helicopter. Couplings on opposite ends of the lift bar may connect the cable to the lift bar when the cable extends through couplings. The spreader bar is mountable to the cable between the load and the lift bar. The vertical lift system may advantageously facilitate aircraft recovery via a long line from a helicopter. For instance, the mounting loops of the cable may be connected to different points on a frame of the aircraft in order to lift the aircraft more evenly than a single attachment point, e.g., despite using only a single cable. In addition, due to the cable extending through the couplings on the lift bar, the lift bar may be adjusted to a suitable location on the cable to move the lift point for the long line to a desired location. The spreader bar may assist with positioning the cable, e.g., such that the cable does not rub the aircraft during lifting. Additional aspects and advantages of the invention will be set forth in part in the following description, or may be apparent from the description, or may be learned through practice of the invention.

In a first example embodiment, a c includes a cable, a lift bar, a pair of cable blocks, a lift block, and a spreader bar. The includes a pair of mounting loops positioned at opposite end portions of the cable. The pair of cable blocks are mounted to the lift bar at opposite end portions of the lift bar. The cable is mountable to the lift bar at the pair of cable blocks. The lift block is mounted to the lift bar between the pair of cable blocks. A spreader bar is mountable to the cable. The spreader bar includes an elongated shaft and a pair of cable couplings mounted to elongated shaft at opposite end positions of the elongated shaft. The cable is extendable through the pair of cable blocks on the lift bar and the pair of cable couplings of the spreader bar such that spreader bar is positioned between the lift block and the pair of mounting loops of the cable.

In a second example embodiment, a vertical lift system includes a cable, a lift bar assembly, and a spreader bar. The cable includes a pair of mounting loops positioned at opposite end portions of the cable. The lift bar assembly includes a lift bar, a pair of cable blocks mounted to the lift bar at opposite end portions of the lift bar, and a lift block mounted to the lift bar between the pair of cable blocks. The cable is mountable to the lift bar at the pair of cable blocks. The spreader bar is mountable to the cable. The spreader bar includes an elongated shaft extending between a first end portion and a second end portion. A pair of friction locking couplings is mounted to elongated shaft. Each friction locking cable coupling of the pair of friction locking couplings is positioned at a respective one of the first and second end portions of the elongated shaft. Each friction locking cable coupling of the pair of friction locking couplings includes a block with a curved engagement surface and a pair of pivots mounted to the block. The pivots of the pair of pivots are spaced from the curved engagement surface of the block such that a cable is receivable between the pair of pivots and the curved engagement surface of the block. The cable is extendable through the pair of cable blocks on the lift bar and the pair of cable couplings of the spreader bar such that spreader bar is positioned between the lift block and the pair of mounting loops of the cable. The curved engagement surface of the block is shaped such that the cable is bent between the pair of pivots and the curved engagement surface of the block and static friction between the cable and the curved engagement surface of the block holds the cable against the block when the cable is received between the pair of pivots and the curved engagement surface of the block. A position of the pair of cable blocks on the cable is selectively adjustable, and a position of the pair of friction locking couplings of the spreader bar is also selectively adjustable.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 1:
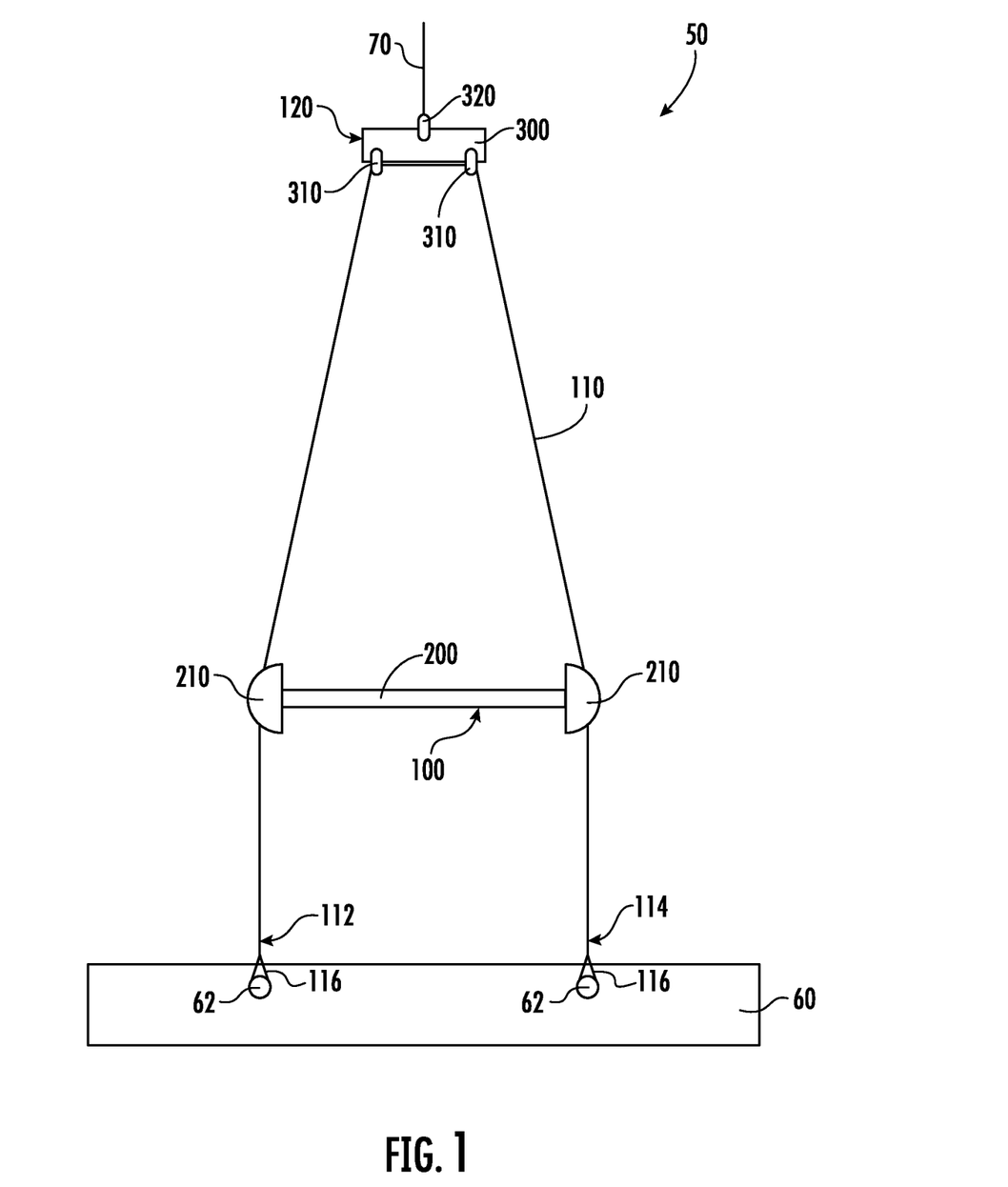
FIG. 1 is a schematic view of a vertical lift system according to an example embodiment of the present subject matter.

FIG. 1 provides a schematic view of a vertical lift system 50 according to an example embodiment of the present subject matter. As may be seen in FIG. 1, vertical lift system 50 includes a spreader bar assembly 100, a cable 110, and a lift bar assembly 120. As discussed in greater detail below, spreader bar assembly 100 and lift bar assembly 120 assist with positioning cable 110 to facilitate movement of a load 60 with vertical lift system 50. Load 60 may be any suitable type of load. For example, load 60 may be a grounded aircraft, such as a helicopter.

Cable 110 may be a single cable that connects to multiple points on load 60. For instance, cable 110 may include a pair of mounting loops 116. Each of mounting loops 116 may be positioned or formed at a respective end of cable 110. Mounting loops 116 may be connected or coupled to different points on load 60. As shown in FIG. 1, load 60 may have multiple connection points 62 that are spaced apart on load 60. Each of mounting loops 116 may be connected or coupled to a respective one of connection points 62. As a particular example, each of mounting loops 116 may be connected to opposite sides or ends of a grounded aircraft to assist with lifting the grounded aircraft during transport or recovery of the grounded aircraft with a helicopter. Vertical lift system 50 may also include buckles, lifting shackles, hooks, or other suitable couplings to assist with securing mounting loops 116 to load 60 at connection points 62.

A length of cable 110, e.g., between mounting loops 116 at opposite ends of cable 110, may be selected to assist with lifting load 60. For instance, the length of cable 110 may be no less than three meters (3 m) and no greater than thirty meters (30 m) in certain example embodiments. As another example, the length of cable 110 may be no less than five meters (5 m) and no greater than fifteen meters (15 m) in certain example embodiments. Such sizing of cable 110 may advantageously allow connection of cable 110 to variously sized loads 60, e.g., while also allowing storage of vertical lift system 50 within a case that is easily manually movable.

In addition to load 60, cable 110 may also be connected to lift bar assembly 120. For instance, lift bar assembly 120 may be coupled to cable 110 between mounting loops 116. Moreover, as shown in FIG. 1, cable 110 may extend or loop through lift bar assembly 120 between mounting loops 116. Lift bar assembly 120 may assist with connecting cable 110 (e.g., and thus load 60) to a long line 70 from an airborne helicopter. Thus, the airborne helicopter may lift load 60 via long line 70 and vertical lift system 50. Lift bar assembly 120 may assist with positioning cable 110 to facilitate movement of load 60 with vertical lift system 50. For instance, as noted above, cable 110 may be a single cable that connects to multiple points on load 60. It will be understood that, without lift bar assembly 120, cable 110 could be connected to long line 70 via a hook, shackle, etc.; however, cable 110 would turn at a sharp angle on the hook, shackle, etc., which may lead to undesirable wear of cable 110. Cable 110 may loop through lift bar assembly 120 such that the cable 110 does not turn at such sharp angle, e.g., and thereby advantageously avoid undesirable wear of cable 110.

Spreader bar assembly 100 may be coupled to cable 110 between lift bar assembly 120 and load 60, and spreader bar assembly 100 may assist with positioning cable 110 to facilitate movement of load 60 with vertical lift system 50. It will be understood that, without spreader bar assembly 100, portions of cable 110 would extend rectilinearly between lift bar assembly 120 and load 60 when vertical lift system 50 is used to move load 60 and cable 110 is in tension. Spreader bar assembly 100 may be positioned on cable 110 to modify the path of cable 110 between lift bar assembly 120 and load 60. For example, cable 110 may extend at a lesser angle between spreader bar assembly 100 and load 60 compared to without spreader bar assembly 100. Thus, e.g., spreader bar assembly 100 may assist with preventing or limiting rubbing or other undesirable contact between load 60 and cable 110 during operation of vertical lift system 50. As discussed in greater detail below, spreader bar assembly 100 includes features for coupling or connecting spreader bar assembly 100 to cable 110.

Figure 2:
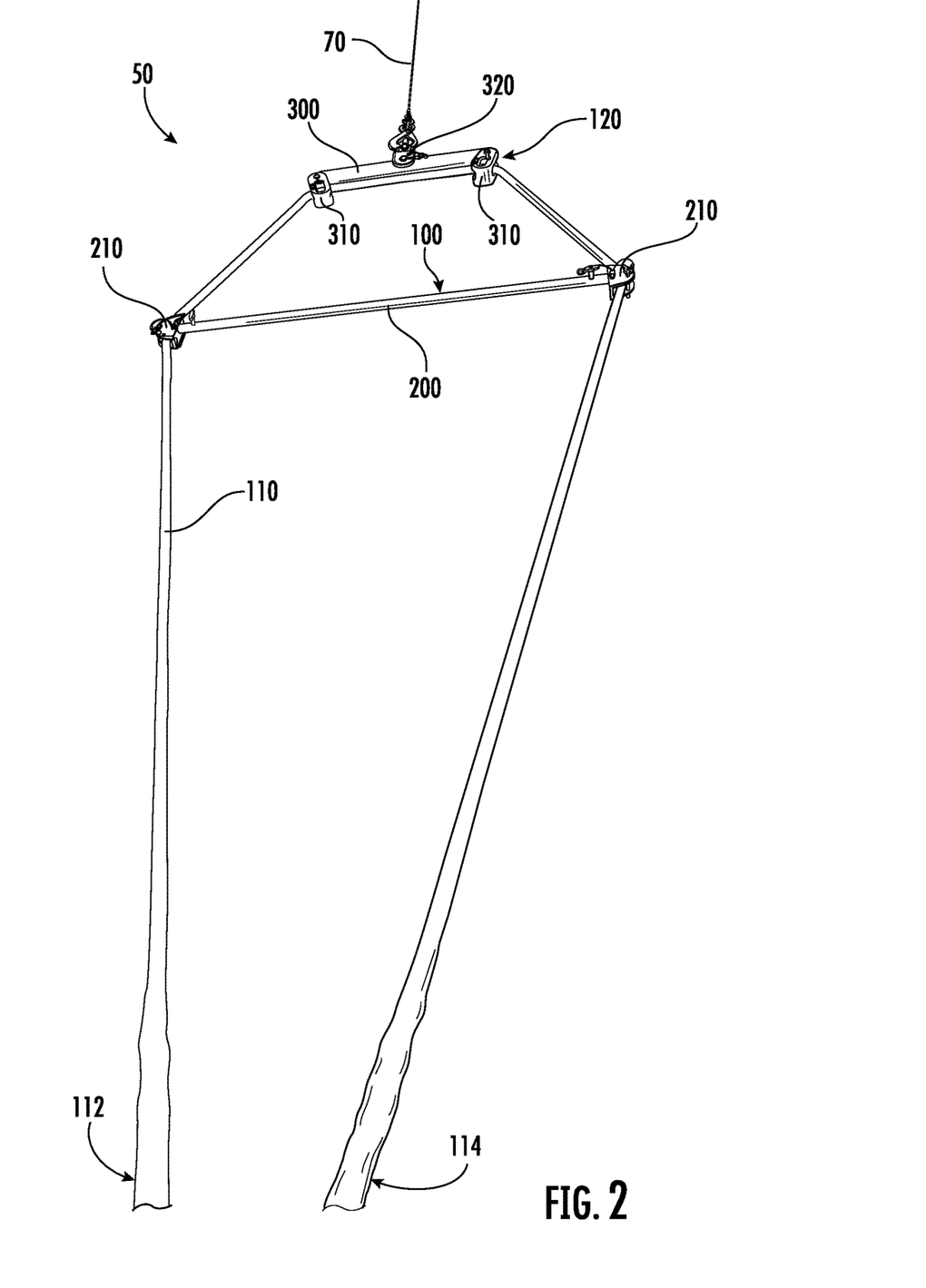
FIG. 2 is a perspective view of a cable, a lift bar assembly, and a spreader bar assembly of the example vertical lift system of FIG. 1.
Figure 3:
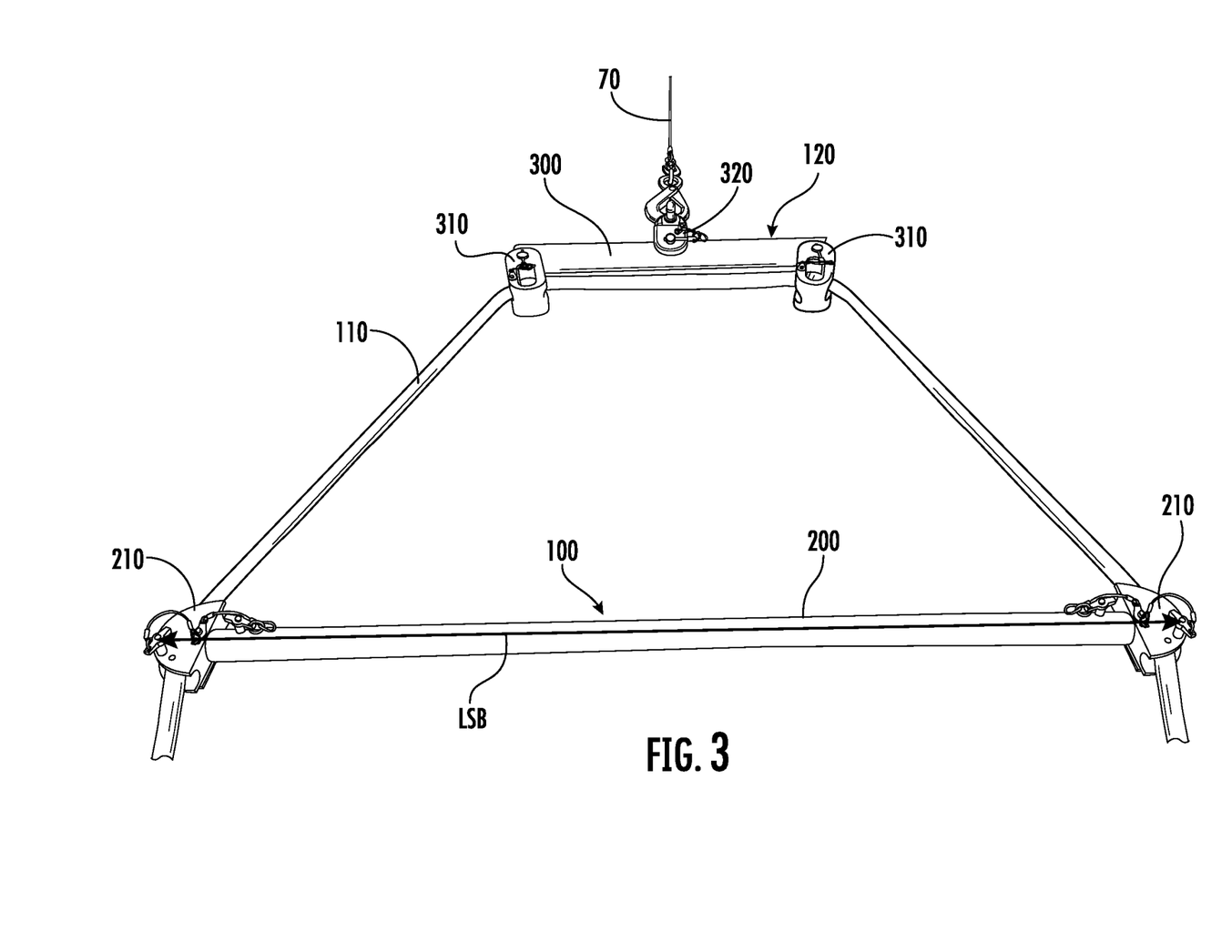
FIG. 3 is another perspective view of the cable, lift bar assembly, and spreader bar assembly of FIG. 2.
Figure 4:
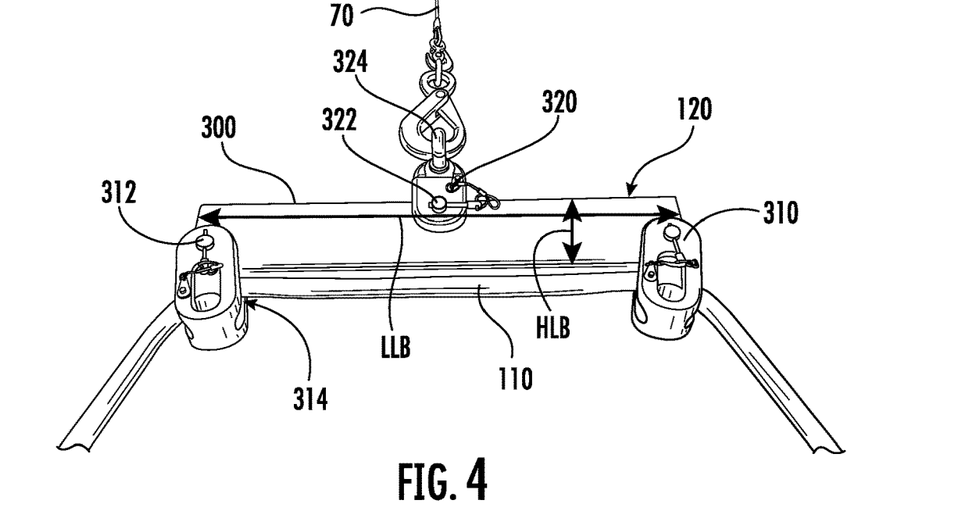
FIG. 4 is a perspective view of the cable and lift bar assembly of FIG. 2.

Turning now to FIGS. 2 through 4, lift bar assembly 120 may include a lift bar 300, a pair of cable blocks 310, and a lift block 320. Lift bar 300 may be constructed of or with a suitable material, such carbon fibers and/or a metal, e.g., aluminum, steel, or titanium. Thus, e.g., lift bar 300 may be a carbon fiber bar or beam in certain example embodiments. As another example, lift bar 300 may be an aluminum bar or beam in certain example embodiments. As further example, lift bar 300 may be a composite of materials. For instance, a core of lift bar 300 may be magnesium, titanium, aluminum, etc., and carbon fibers may be adhered to the core.

Lift bar 300 may be dimensioned to support load 60. For instance, lift bar 300 may extend longitudinally along a length LLB (FIG. 4) of lift bar 300. The length LLB of lift bar 300 may be no less than thirty centimeters (30 cm) and no greater than one hundred centimeters (100 cm) in certain example embodiments. Moreover, a height HLB (FIG. 4) of lift bar 300, e.g., between top and bottom edges of lift bar 300 and/or perpendicular to the length LLB of lift bar 300, may be no less than ten centimeters (10 cm) and no greater than twenty-five centimeters (25 cm) in certain example embodiments. A width of lift bar 300, e.g., between front and rear faces of lift bar 300 and/or perpendicular to both the length LLB and height HLB of lift bar 300, may be no less than one centimeter (1 cm) and no greater than eight centimeters (8 cm) in certain example embodiments.

Cable blocks 310 may be mounted to lift bar 300. Moreover, cable blocks 310 may be positioned at opposite end portions of lift bar 300 and/or spaced apart along the length LLB of lift bar 300. Cable blocks 310 may be mounted to lift bar 300 via pins 312 that extend through both cable blocks 310 and lift bar 300, as shown in FIG. 4. Cable 110 is mountable to lift bar 300 at cable blocks 310. For instance, as shown in FIG. 4, cable 110 may extend through both of cable blocks 310. Thus, a portion of cable 110 may extend along the length LLB lift bar 300 when cable 110 is mounted to lift bar 300. To mount cable 110, cable blocks 310 may define a passage 314 spaced from lift bar 300, and cable 110 may extend through passages 314 to mount cable 110 to lift bar 300 via cable blocks 310. Passages 314 may be sized such that cable 110 is slidable through passages 314 and cable blocks 310, e.g., when cable 110 is not under tension lifting load 60. Thus, e.g., a width, diameter, etc. of passages 314 may be greater than an associated width, diameter, etc. of cable 110. Cable blocks 310 may be formed via a machined metal block, such as an aluminum or titanium block.

Lift block 320 may also be mounted to lift bar 300. For example, lift block 320 may be mounted to lift bar 300 via a pin 322 that extend through both lift block 320 and lift bar 300, as shown in FIG. 4. Lift block 320 may be positioned between cable blocks 310 on lift bar 300, e.g., along the length LLB of lift bar 300. For instance, lift block 320 may be positioned about equidistant between cable blocks 310 on lift bar 300. Lift block 320 may also be positioned on opposite portions of lift bar 300 from cable blocks 310. Thus, e.g., as shown in FIG. 4, lift block 320 and cable blocks 310 may be spaced apart along the height HLB of lift bar 300. Moreover, lift block 320 may be positioned at the top portion of lift bar 300, and cable blocks 310 may be positioned at the bottom portion of lift bar 300. Lift block 320 may be configured to assist with mounting lift bar 300 to long line 70. For instance, as shown in FIG. 4, a hook, shackle, etc. on the end of long line 70 may engage or couple to lift block 320, e.g., via a shackle 324 on lift block 320. Thus, e.g., long line 70 may extend from an airborne helicopter to vertical lift system 50 and connect to vertical lift system 50 at lift block 320. Thus connected, vertical lift system 50 may allow the airborne helicopter to lift load 60 via vertical lift system 50.

Figure 5:
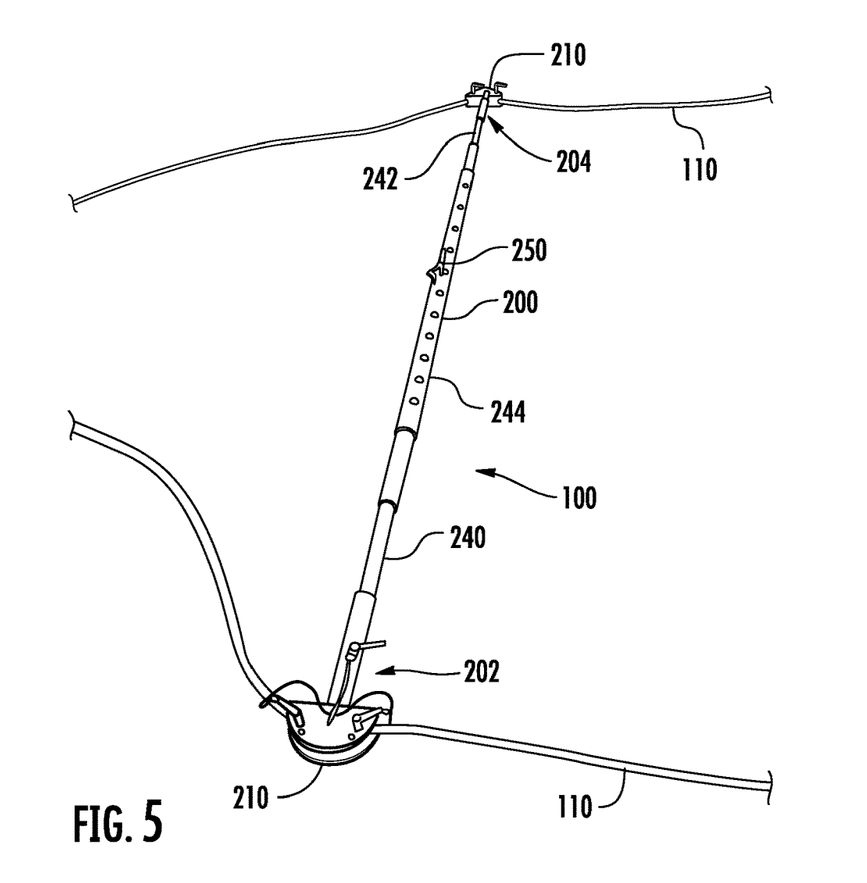
FIG. 5 is a perspective view of the cable and spreader bar assembly of FIG. 2.

FIG. 5 provides a perspective view of spreader bar assembly 100 and cable 110 of vertical lift system 50. As may be seen in FIG. 5, spreader bar assembly 100 may include an elongated shaft 200 and a pair of, e.g., friction locking, cable couplings 210. Elongated shaft 200 extends between a first end portion 202 and a second end portion 204, e.g., that are positioned opposite each other on elongated shaft 200. Cable couplings 210 are mounted to elongated shaft 200. In particular, each cable coupling 210 may be positioned at a respective one of first and second end portions 202, 204 of elongated shaft 200. Thus, cable couplings 210 may be positioned at opposite ends of elongated shaft 200.

Cable 110 may be coupled to both of cable couplings 210. Cable 110 may extend (e.g., continuously) through cable blocks 310 on lift bar 300 and cable couplings 210 of spreader bar assembly 100. Thus, lifting system 50 may require only one cable 110 to connect lift line 70 with load 60, e.g., rather than the four cables needed with known lift systems. In certain example embodiments, cable couplings 210 may be friction locking. Thus, as discussed in greater detail below, friction between cable 110 and friction locking couplings 210 may selectively hold spreader bar assembly 100 at a particular position on cable 110 between lift bar 300 and load 60.

Figure 6:
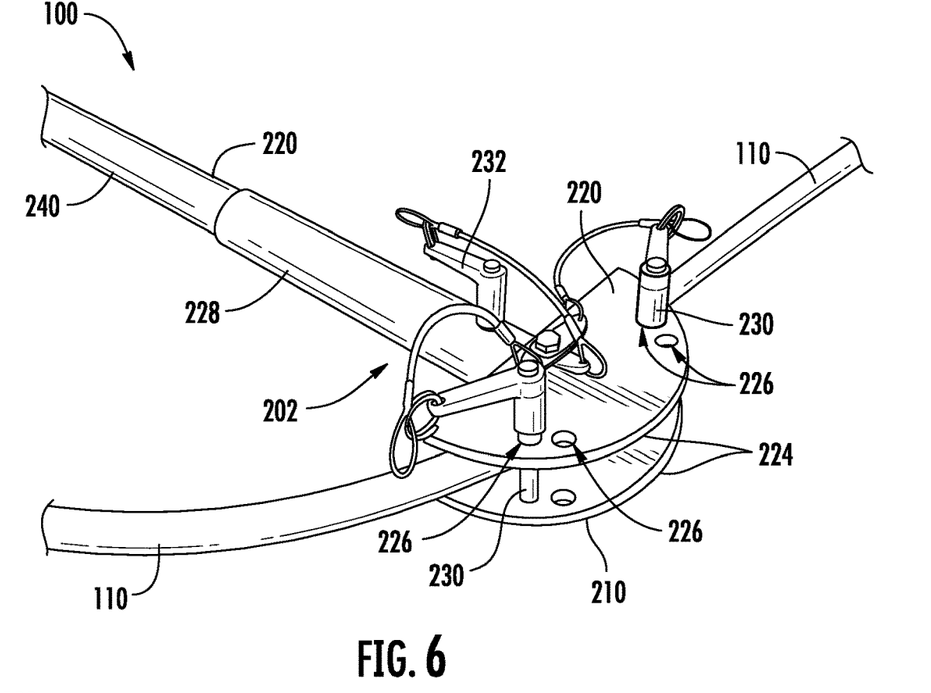
FIG. 6 is a perspective view of a friction locking cable coupling of the spreader bar assembly of FIG. 5.
Figure 7:
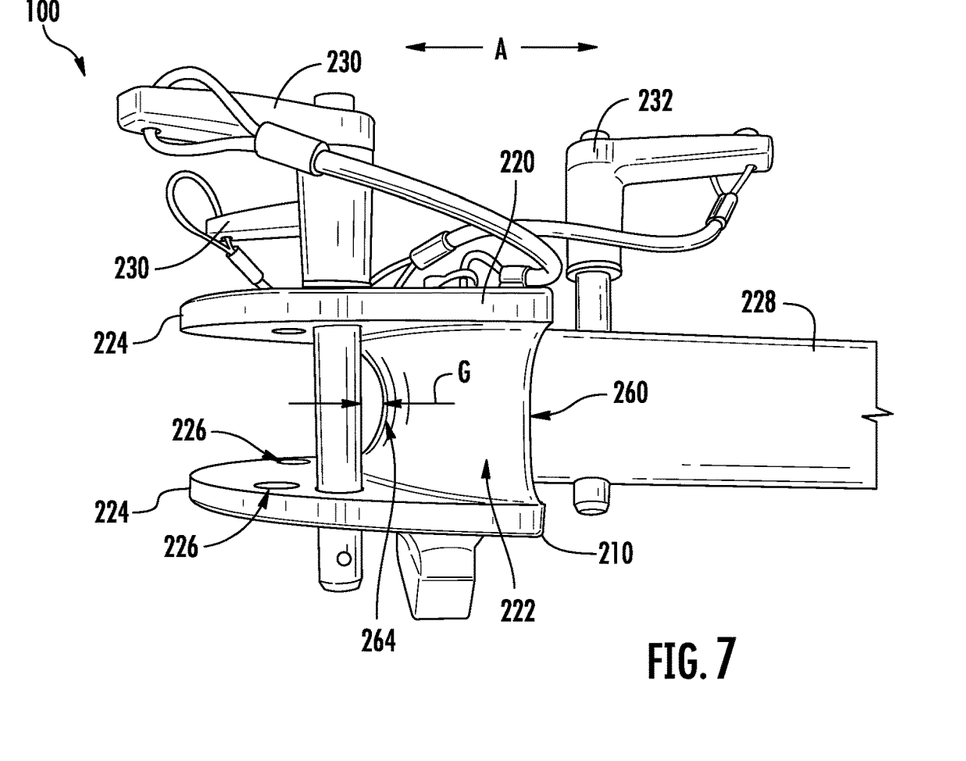
FIG. 7 provides a side, elevation view of the friction locking cable coupling of FIG. 6.
Figure 8:
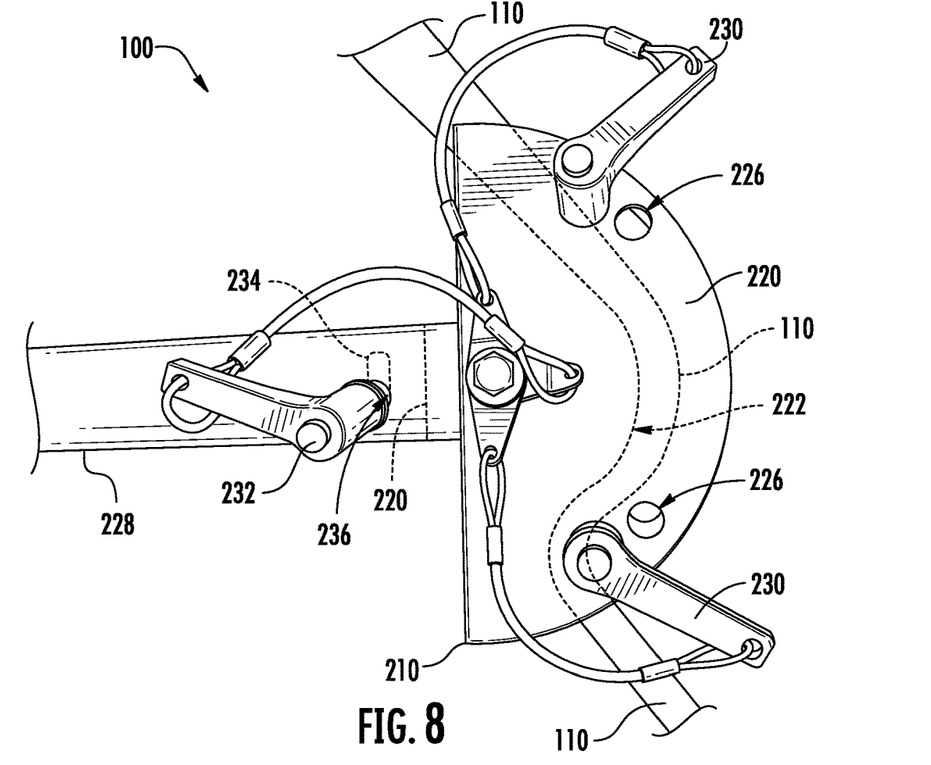
FIG. 8 is a top, plan view of the friction locking cable coupling of FIG. 6.
Figure 9:
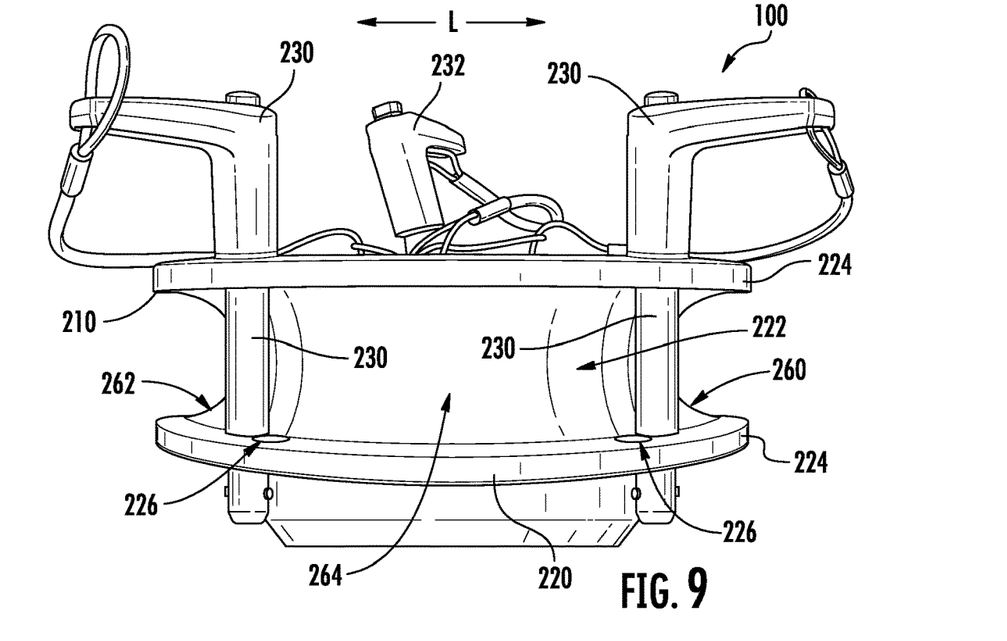
FIG. 9 is another side, elevation view of the friction locking cable coupling of FIG. 6.

FIG. 6 provides a perspective view of friction locking cable coupling 210 of spreader bar assembly 100. FIG. 7 provides a side, elevation view of friction locking cable coupling 210. FIG. 8 provides a top, plan view of friction locking cable coupling 210. FIG. 9 provides another side, elevation view of friction locking cable coupling 210. Friction locking cable coupling 210 is discussed in greater detail below with reference to FIGS. 6 through 9.

Each of friction locking cable coupling 210 includes a block 220 and a pair of pivots 230 mounted to block 220. Block 220 has a curved engagement surface 222, and pivots 230 are mounted to block 220 such that pivots 230 are spaced from curved engagement surface 222 of block 220. Thus, cable 110 is receivable between pivots 230 and curved engagement surface 222 of block 220. Curved engagement surface 222 of block 220 is shaped such that cable 110 is bent between pivots 230 and curved engagement surface 222 of block 220 when cable 110 is received between pivots 230 and curved engagement surface 222 of block 220. Thus, static friction between cable 110 and curved engagement surface 222 of block 220 holds cable 110 against block 220 when cable 110 is received between pivots 230 and curved engagement surface 222 of block 220.

Block 220 may be formed of or with aluminum. Thus, block 220 may be a machined aluminum block. Curved engagement surface 222 may also have an arcuate or semicircular shape. Thus, curved engagement surface 222 may be an arcuate engagement surface. Block 220 may also include a pair of sidewalls 224 that are spaced apart from each other on block 220. Curved engagement surface 222 may be positioned between sidewalls 224, and pivots 230 may be mounted to block 220 by extending pivots between and/or through sidewalls 224 of block 220. Thus, cable 110 may also be received between sidewalls 224 when cable 110 is received between pivots 230 and curved engagement surface 222 of block 220.

Pivots 230 may be removable pins, such as ball lock pins. Thus, pivots 230 may be selectively mountable to block 220. In addition, each sidewall 224 may define four or more holes 226. A position of each pivot 230 on block 220 may be selectively adjustable by extending each pivot 230 through a respective one of holes 226 on each sidewall 224. Holes 226 may be spaced on sidewalls 224 to allow receipt of various diameters of cable 110 between curved engagement surface 222 of block 220 and pivots 230. Thus, e.g., with reference to FIG. 8, each of pivots 230 may be moved to an adjacent one of holes 226 on sidewall 224 to accommodate a larger diameter cable than cable 110.

Friction locking couplings 210 may be pivotally mounted to elongated shaft 200. For example, spreader bar assembly 100 may include a mounting pin 232, e.g., a ball lock pin. Mounting pin 232 extends through elongated shaft 200 and friction locking cable coupling 210 in order to selectively mount friction locking cable coupling 210 to elongated shaft 200. For example, a post 228 may be mounted to block 220, and post 228 may be received on or within elongated shaft 200. In particular, an inner diameter of post 228 may be complementary to an outer diameter of elongated shaft 200 (e.g., at first end portion 202 or second end portion 204 of elongated shaft 200). Elongated shaft 200 may define a slot 234 (FIG. 8), and mounting pin 232 may be received within slot 234. In particular, mounting pin 232 may extend through post 228 at a hole 236 in post 228 of block 220 and then through elongated shaft 200 at slot 234. Slot 234 may be sized, e.g., elongated, such that friction locking cable coupling 210 is pivotable on elongated shaft 200. In particular, mounting pin 232 may slide within slot 234 to allow friction locking cable coupling 210 is pivotable relative to elongated shaft 200. In contrast, hole 236 of post 228 may be shaped complementary to mounting pin 232, e.g., both mounting pin 232 and hole 236 may have circular cross-sections. Pivotally mounting friction locking cable coupling 210 to elongated shaft 200, e.g., with slot 234, may assist with providing self-adjusting lifting or pulling angles, e.g., in vertical and horizontal planes, during use of vertical lift system 50 when cable 110 is in tension. In alterative example embodiments, slot 234 may be defined in post 228, e.g., when post 228 is received within elongated shaft 200.

Turning back to FIG. 5, elongated shaft 200 may include a first shaft segment 240, a second shaft segment 242 and a third shaft segment 244. Additional shaft segments (not shown) may also be added to elongated shaft 200 to increase a length of elongated shaft 200. Friction locking couplings 210 may be positioned at and mounted to a respective one of first and second shaft segments 240, 242, e.g., with posts 228 and mounting pins 232 as discussed above. First and second shaft segments 240, 242 may be mounted to third shaft segment 244 such that exposed lengths of first and second shaft segments 240, 242 from third shaft segment 244 are adjustable. Thus, e.g., first and second shaft segments 240, 242 may be slidable on or in third shaft segment 244 in order to adjust an overall length of spreader bar assembly 100. Spreader bar assembly 100 may also include locking pins 250, e.g., ball lock pins, that each extend through one of: (1) first shaft segment 240 and third shaft segment 244; and (2) second shaft segment 242 and third shaft segment 244 in order to lock such shaft segments together. Elongated shaft 200 may be formed of or with titanium. Thus, elongated shaft 200 may be a tubular titanium shaft or be constructed with tubular titanium segments. As another example, elongated shaft 200 may be a tubular aluminum and magnesium alloy shaft or be constructed with tubular aluminum and magnesium alloy segments. Utilizing titanium and/or aluminum and magnesium alloy in elongated shaft 200 may provide a strong and/or lightweight elongated shaft 200.

With reference to FIG. 9, curved engagement surface 222 may have a first end 260 and a second end 262. First and second ends 260, 262 may be positioned opposite each other on curved engagement surface 222. Pivots 230 are mounted to block 220 such that pivots 230 are positioned between first and second ends 260, 262 of curved engagement surface 222, e.g., along a direction L that is perpendicular to a length of elongated shaft 200. In addition, each pivot 230 may be spaced from curved engagement surface 222 (e.g., the closest portion of curved engagement surface 222) by more than the diameter of cable 110 in order to allow receipt of cable 110 between pivots 230 and curved engagement surface 222 while also allowing sliding of first cable 112 through friction locking cable coupling 210. As a particular example, each pivot 230 may be spaced from curved engagement surface 222 (e.g., the closest portion of curved engagement surface 222) by no greater than twice the diameter of cable 110. Further, as shown in FIG. 7, curved engagement surface 222 has a peak 264 positioned between pivots 230 along the direction L. As shown in FIG. 7, peak 264 of curved engagement surface 222 may be spaced from pivots 230 by a gap G, e.g., along a direction A that is parallel to the length of elongated shaft 200 and/or perpendicular to the direction L. The gap G may be less than a diameter of the cable 110. As a particular example, the gap G may be no greater than half the diameter of the cable 110. The above described spacing of curved engagement surface 222 and pivots 230 may assist with friction locking of cable 110 to block 220.

Vertical lift system 50 with spreader bar assembly 100, cable 110, and lift bar assembly 120 has numerous advantages over known vertical lift systems. For example, the positions of cable blocks 310 and cable couplings 210 on cable 110 may be selectively adjusted. In particular, when cable 110 is unloaded, a user of vertical lift system 50 may slide cable 110 within cable blocks 310 and/or cable couplings 210 to adjust the position of lift bar assembly 120 and/or spreader bar assembly 100 on cable 110. Thus, depending upon the desired configuration: (1) the position of lift bar assembly 120 on cable 110 may be adjusted to positioned by sliding cable 110 relative to lift bar assembly 120; and/or (2) the position of spreader bar assembly 100 between lift bar assembly 120 and load 60 may be adjusted to position either closer to lift bar assembly 120 or closer to load 60. In addition, vertical lift system 50 requires fewer cables than known lift systems because cable 110 extends through and locks with spreader bar assembly 100 and lift bar assembly 120 rather than having numerous separate cables as with known systems. Moreover, because no cable terminates at spreader bar assembly 100, spreader bar assembly 100 may have no lift points and adverse effects of non-compression loading on spreader bar assembly 100 may be reduced relative to known spreader bars.

Vertical lift system 50 may also have other benefits over known loading systems. For example, vertical lift system 50 may be advantageously lighter than known loading system. In particular, vertical lift system 50 may collectively weigh less than thirty-five pounds. Thus, vertical lift system 50 may be useful in aircraft recovery with a helicopter. In particular, vertical lift system 50 can be a strong, light weight, low vertical lift system that improves worker safety associated with aircraft recoveries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A vertical lift system, comprising:
   a cable with a pair of mounting loops positioned at opposite end portions of the cable;
   a lift bar;
   a pair of cable blocks mounted to the lift bar at opposite end portions of the lift bar, the cable mountable to the lift bar at the pair of cable blocks;
   a lift block mounted to the lift bar between the pair of cable blocks; and
   a spreader bar mountable to the cable, the spreader bar comprising an elongated shaft and a pair of cable couplings mounted to said elongated shaft at opposite end positions of the elongated shaft,
   wherein the cable is extendable through the pair of cable blocks on the lift bar and the pair of cable couplings of the spreader bar such that spreader bar is positioned between the lift block and the pair of mounting loops of the cable.

2. The vertical lift system of claim 1, wherein the lift bar comprises a carbon fiber bar, and the pair of cable blocks on the lift bar comprise machined aluminum blocks.

3. The vertical lift system of claim 1, wherein the lift block and the pair of cable blocks are positioned on opposite side portions of the lift bar.

4. The vertical lift system of claim 3, wherein the lift block is positioned about equidistance between the pair of cable blocks on the lift bar.

5. The vertical lift system of claim 1, wherein the cable couplings of the spreader bar are a pair of friction locking couplings, each friction locking cable coupling of the pair of friction locking couplings comprising:
  a block with a curved engagement surface; and
  a pair of pivots mounted to the block, the pivots of the pair of pivots spaced from the curved engagement surface of the block such that the cable is receivable between the pair of pivots and the curved engagement surface of the block,
  wherein the curved engagement surface of the block is shaped such that the cable is bent between the pair of pivots and the curved engagement surface of the block and static friction between the cable and the curved engagement surface of the block holds the cable against the block when the cable is received between the pair of pivots and the curved engagement surface of the block.

6. The vertical lift system of claim 5, wherein the block is a machined aluminum block and the curved engagement surface is an arcuate engagement surface.

7. The vertical lift system of claim 6, wherein the block comprises a pair of sidewalls, the curved engagement surface positioned between the pair of sidewalls, the pivots extending through the pair of sidewalls.

8. The vertical lift system of claim 7, wherein each sidewall of the pair of sidewalls defines at least four holes, a position of each pivot of the pair of pivots on the block selectively adjustable by extending each pivot of the pair of pivots through a respective one of the of the at least four holes.

9. The vertical lift system of claim 5, wherein the pivots of the pair of pivots are removable pins that are selectively mountable to the block.

10. The vertical lift system of claim 5, further comprising a mounting pin that extends through the elongated shaft and one of the pair of friction locking couplings in order to selectively mount the one of the pair of friction locking couplings to the elongated shaft.

11. The vertical lift system of claim 10, wherein a post of the block or the elongated shaft defines a slot, the mounting pin received within the slot such that the one of the pair of friction locking couplings is pivotable on the elongated shaft.

12. The vertical lift system of claim 10, wherein the elongated shaft comprises a first shaft segment, a second shaft segment and a third shaft segment, each friction locking coupling of the pair of friction locking couplings positioned at a respective one of the first and second shaft segments, the first and second shaft segments mounted to the third shaft segment such that exposed lengths of the first and second shaft segments from the third shaft segment are adjustable.

13. The vertical lift system of claim 1, wherein the elongated shaft comprises tubular titanium.

14. The vertical lift system of claim 1, wherein the cable is a plastic-coated cable.

15. The vertical lift system of claim 1, wherein a position of the pair of cable blocks on the cable is selectively adjustable, and a position of the pair of cable couplings of the spreader bar is selectively adjustable.

16. A vertical lift system, comprising:
  a cable with a pair of mounting loops positioned at opposite end portions of the cable;
  a lift bar assembly comprising
    a lift bar,
    a pair of cable blocks mounted to the lift bar at opposite end portions of the lift bar, the cable mountable to the lift bar at the pair of cable blocks, and
    a lift block mounted to the lift bar between the pair of cable blocks; and
  a spreader bar mountable to the cable, the spreader bar comprising
    an elongated shaft extending between a first end portion and a second end portion,
    a pair of friction locking couplings mounted to said elongated shaft, each friction locking coupling of the pair of friction locking couplings positioned at a respective one of the first and second end portions of the elongated shaft, each friction locking coupling of the pair of friction locking couplings comprising a block with a curved engagement surface and a pair of pivots mounted to the block, the pivots of the pair of pivots spaced from the curved engagement surface of the block such that the cable is receivable between the pair of pivots and the curved engagement surface of the block,
  wherein the cable is extendable through the pair of cable blocks on the lift bar and the pair of cable couplings of the spreader bar such that spreader bar is positioned between the lift block and the pair of mounting loops of the cable,
  wherein the curved engagement surface of the block is shaped such that the cable is bent between the pair of pivots and the curved engagement surface of the block and static friction between the cable and the curved engagement surface of the block holds the cable against the block when the cable is received between the pair of pivots and the curved engagement surface of the block, and
  wherein a position of the pair of cable blocks on the cable is selectively adjustable, and a position of the pair of friction locking couplings of the spreader bar is selectively adjustable.

17. The vertical lift system of claim 16, wherein the lift bar comprises a carbon fiber bar, and the pair of cable blocks on the lift bar comprise machined aluminum blocks.

18. The vertical lift system of claim 16, wherein the lift block and the pair of cable blocks are positioned on opposite side portions of the lift bar.

19. The vertical lift system of claim 16, wherein the elongated shaft comprises tubular titanium.

20. The vertical lift system of claim 16, wherein the cable is a plastic-coated cable.

* * * * *